United States Patent
Niko et al.

(10) Patent No.: US 8,186,237 B2
(45) Date of Patent: May 29, 2012

(54) CHANGE SPEED TRANSMISSION

(75) Inventors: Michael Niko, Schwieberdingen (DE); Alfons Britten, Friedrichshafen (DE); Frank Kurrle, Pleidelsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 936 days.

(21) Appl. No.: 12/187,758

(22) Filed: Aug. 7, 2008

(65) Prior Publication Data
US 2009/0049939 A1 Feb. 26, 2009

(30) Foreign Application Priority Data
Aug. 21, 2007 (DE) .................. 10 2007 039 481

(51) Int. Cl.
*F16H 3/08* (2006.01)

(52) U.S. Cl. .......................... 74/331; 74/451

(58) Field of Classification Search .................. 74/330, 74/331, 339, 340, 451; 384/540, 542, 562; 475/220, 230; 403/365
See application file for complete search history.

(56) References Cited

U.S. PATENT DOCUMENTS

| | | | | |
|---|---|---|---|---|
| 1,817,660 A * | 8/1931 | Winther et al. | ................ | 310/99 |
| 2,756,616 A * | 7/1956 | Forster | ........................ | 477/57 |
| 2,942,490 A | 6/1960 | Riley, Jr. et al. | | |
| 3,112,116 A * | 11/1963 | Seitz | ........................... | 279/2.17 |
| 3,622,185 A * | 11/1971 | Rosan et al. | ................ | 403/316 |
| 4,558,607 A | 12/1985 | Szodfridt | | |
| 4,630,719 A | 12/1986 | McCormick | | |
| 4,722,240 A * | 2/1988 | Frederick et al. | ............. | 74/450 |
| 6,050,152 A * | 4/2000 | Alfredsson | ................ | 74/325 |
| 6,769,809 B2 * | 8/2004 | Maret | ........................ | 384/512 |
| 2006/0185458 A1 * | 8/2006 | Gerlofs et al. | ............... | 74/335 |

FOREIGN PATENT DOCUMENTS

| | | |
|---|---|---|
| DE | 1113347 B | 8/1961 |
| DE | 3244042 A1 | 5/1984 |
| DE | 3626822 A1 | 3/1987 |
| JP | 2005299864 A | 10/2005 |

OTHER PUBLICATIONS

German Search Report dated Jul. 6, 2009.

\* cited by examiner

*Primary Examiner* — Justin Holmes
*Assistant Examiner* — Huan Le

(57) ABSTRACT

A transmission, in particular a dual clutch transmission, has a plurality of transmission shafts and a fastening apparatus for at least one fixed gear on one of the transmission shafts. The fixed gear is held axially on the transmission shaft by way of a fastening nut. The fixed gear is formed with a recess around the transmission shaft in a region that lies radially below the gear toothing system. A fastening sleeve is positioned in the recess between the fixed gear and the transmission shaft in a section which adjoins a fastening nut. During the clamping of the fastening nut, the latter bears against the fastening sleeve. As a result, the transmission of micromovements to the fastening nut is minimized or prevented, with the result that loosening of the fastening nut does not take place during the operation of the transmission.

11 Claims, 3 Drawing Sheets

CHANGE SPEED TRANSMISSION

CROSS-REFERENCE TO RELATED APPLICATION

This application claims the priority, under 35 U.S.C. §119, of German application DE 10 2007 039 481.2, filed Aug. 21, 2007, which is herewith incorporated by reference in its entirety.

BACKGROUND OF THE INVENTION

Field of the Invention

The invention relates to a transmission having a plurality of transmission shafts, in particular for a motor vehicle, and a fastening apparatus for at least one transmission gearwheel on one of the transmission shafts. The transmission gearwheel is configured as a fixed gear and held axially on the transmission shaft by way of a fastening nut.

In change speed transmissions, fixed gears are usually fastened to a transmission shaft, in particular an output shaft, by an axial securing nut, in order to achieve axial clamping. Relative movements which are transmitted to the neighboring axial securing nut are produced on the fixed gear by the vibrations or by the transmitted forces and torques. These vibrations or micromovements cause so-called microslip, which as a rule leads to loosening of the axial securing nut. "Caulking" of the axial securing nut is therefore required, in order to prevent release of the nut. The caulking which is performed leads to an additional positively locking connection and therefore to reliable fastening of the gearwheel set by the axial securing nut. Nevertheless, caulking of this type causes additional costs and requires additional installation space in the transmission. Moreover, rolling bodies of a roller sleeve which is adjacent to the axial securing nut can run against a caulking groove in the axial direction and are damaged as a result.

SUMMARY OF THE INVENTION

It is accordingly an object of the invention to provide a change speed transmission, which overcomes the above-mentioned disadvantages of the heretofore-known devices and methods of this general type and which improves the arrangement of the gear sets and their fastening on a transmission shaft.

With the foregoing and other objects in view there is provided, in accordance with the invention, a transmission, comprising:

a plurality of transmission shafts;

a transmission gearwheel fastened to one of the transmission shafts, the transmission gearwheel being configured as a fixed gear;

a fastening nut holding the fixed gear axially on the transmission shaft;

the fixed gear having a recess formed around the transmission shaft in a section adjoining the fastening nut; and a fastening sleeve disposed in the recess, between the fixed gear and the transmission shaft.

In other words, the transmission according to the invention is distinguished by the fact that a fixed gear is designed in such a way that a recess which is formed around the transmission shaft is provided in a section which adjoins a fastening nut, in which recess a fastening sleeve is positioned between the fixed gear and the transmission shaft. The recess is preferably of annular design and represents a radial widening portion of the fixed gear hole in the section which adjoins the fastening nut. The recess is preferably provided in a region below a gear toothing system of the fixed gear.

According to the invention, the fastening sleeve is dimensioned in accordance with the size of the recess. After its clamping, the fastening nut which is arranged immediately adjacently bears directly against the fastening sleeve. A direct contact between the fixed gear and the fastening nut is avoided by this arrangement, with the result that the fastening sleeve represents a decoupling section between the fixed gear and the fastening nut. Vibrations or micromovements which cause the so-called microslip, and as a rule lead to loosening of the fastening nut, are therefore not transmitted to the latter.

As a consequence, an additional positively locking connection in the form of caulking of the fastening nut is no longer required as a result of the proposed fastening apparatus, so that additional installation space is available in the axial direction of the transmission. Furthermore, the costs which are associated with the caulking are dispensed with, with the result that the production costs for the transmission are reduced. Moreover, an increased torque capacity of the change speed transmission can be realized by the fastening apparatus according to the invention.

In one refinement of the invention, the fastening sleeve is configured in such a way that a locating fit of an internal diameter of the fastening sleeve, here preferably configured as a clearance fit between the fastening sleeve and the transmission shaft, is smaller than a locating fit of an external diameter of the fastening sleeve. Here, there is preferably a clearance fit between the fastening sleeve and the fixed gear. In particular, the external diameter of the fastening sleeve is dimensioned in such a way that, during operation of the change speed transmission, an outer surface of the fastening sleeve remains spaced apart from an inner surface of the fixed gear. A spacing of this type can be between 0.01 mm and 0.06 mm, preferably approximately 0.05 mm. As a result of this arrangement, micromovements are not transmitted from the fixed gear to the fastening sleeve, so that loosening of the fastening nut which bears against the fastening sleeve does not occur. As a result, an additional positively locking connection by caulking of the fastening nut is not required.

In a further refinement of the invention, the fastening sleeve and the fastening nut are of single piece configuration. As a result, further cost advantages and a compact design of the fastening apparatus can be achieved. Moreover, the assembly time and therefore the production costs of the change speed transmission are reduced.

Moreover, an increase in the rigidity of the fastening nut is achieved by the single piece configuration or the integration of the fastening sleeve into the fastening nut. Furthermore, the single piece design leads to an advantageous or optimized load distribution in the region of the intermeshing toothing system between the fixed gear and the transmission shaft. This brings about a reduction in the microslip between the fixed gear and the fastening nut. As a result of the minimization of the direct contact between the fixed gear and the fastening nut, vibrations or micromovements, in particular, are likewise reduced in the thread of the fastening nut, so that microslip in the region of the thread and loosening of the fastening nut which is caused by the former are prevented.

According to a further refinement of the invention, the fixed gear is connected to the transmission shaft by an intermeshing toothing system. Here, the fixed gear is configured in such a way that the center of a gear toothing system of the fixed gear is offset in the axial direction from the intermeshing toothing system. The fastening sleeve preferably extends in the axial direction at least as far as the center of the gear toothing system. Even higher forces or torques can be transmitted by the fixed gear by way of this advantageous arrangement. As a consequence, the torque capacity of the transmission can be increased.

The present arrangement is suitable, in particular, for change speed transmissions of the type which are configured as dual clutch transmissions. In a preferred embodiment, the fixed gear is mounted on an idler shaft.

Other features which are considered as characteristic for the invention are set forth in the appended claims.

Although the invention is illustrated and described herein as embodied in change speed transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
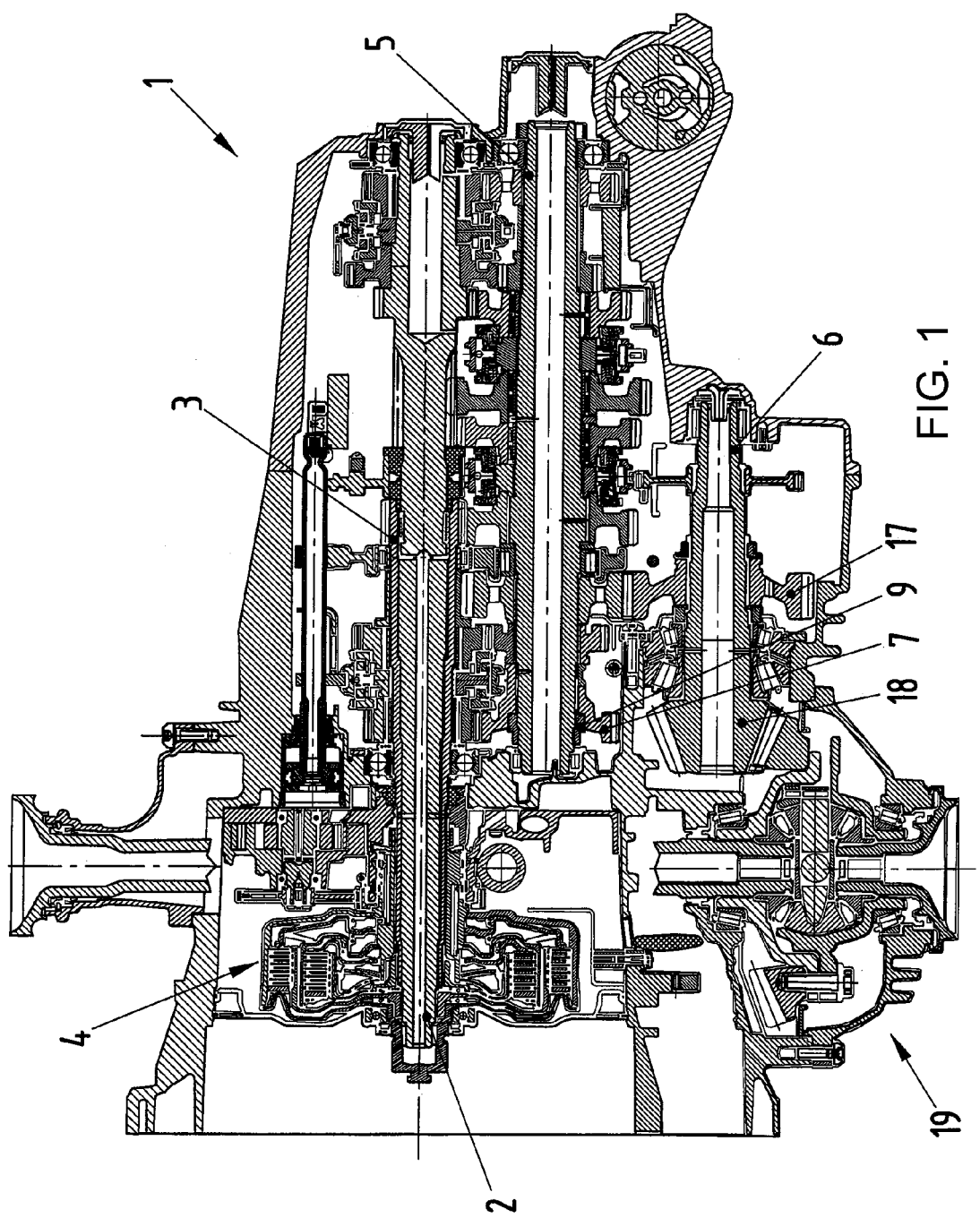
FIG. 1 is a sectional view through a dual clutch transmission having two input shafts, a main shaft, and an output shaft.

Referring now to the figures of the drawing in detail and first, particularly, to FIG. 1 thereof, the change speed transmission 1 is configured as a dual clutch transmission, in which a dual clutch arrangement 4 is connected on the input side to an engine via a crankshaft. Here, the dual clutch arrangement 4 is connected on the output side to two transmission input shafts. A first input shaft 2 is configured as a solid shaft and a second input shaft 3 is configured as a hollow shaft. Gearwheels for a part transmission having the odd gears are arranged on the first input shaft 2, gearwheels for a further part transmission having the even gears being arranged on the second input shaft 3.

In order to form the individual gear stages in the dual clutch transmission according to FIG. 1, gearwheels which are in meshing engagement with the gearwheels of the transmission input shafts 2 and 3 are provided on a main shaft 5 which is arranged parallel to and at a spacing from the two transmission input shafts 2 and 3. It is thus possible for the gearwheels on the main shaft 5 to be configured as loose gears or fixed gears. Furthermore, the change speed transmission 1 has an output shaft 6 which is connected to the main shaft 5 by a constant 17. A pinion 18 which is connected to a differential 19 is arranged at the end of the output shaft 6. The differential 19 preferably represents a rear differential which is arranged in a vehicle having a rear mounted engine or midmounted engine, preferably a boxer engine.

In order to produce a gear, here the fourth gear, a fixed gear 7 which is held by an axial securing nut or fastening nut 9 is positioned at one end of the main shaft 5. It goes without saying that the apparatus according to the invention is suitable for use in all gearwheels irrespectively of the gear which is to be realized in each case. Axial clamping of the gearwheels which are positioned on the main shaft 5 is achieved by way of the fastening nut 9. According to FIG. 2A, the fixed gear 7 has a recess 8 which is formed around the main shaft 5, with the result that a fastening sleeve 10 comes to bear in the recess 8 between the fixed gear 7 and the main shaft 5. Here, the recess 8 is formed in a region or section of the fixed gear 7 which adjoins the fastening nut 9, with the result that, when the fastening nut 9 is clamped, it comes to bear against the fastening sleeve 10. According to a first exemplary embodiment of the invention, the fastening nut 9 and the fastening sleeve 10 are two separately configured parts, by which the gearwheel set is clamped in the axial direction on the main shaft 5. According to the invention, the fixed gear 7 is configured in such a way that the fastening sleeve 10 extends as far as a center line 20 of a gear toothing system 16 of the fixed gear.

Figure 2A:
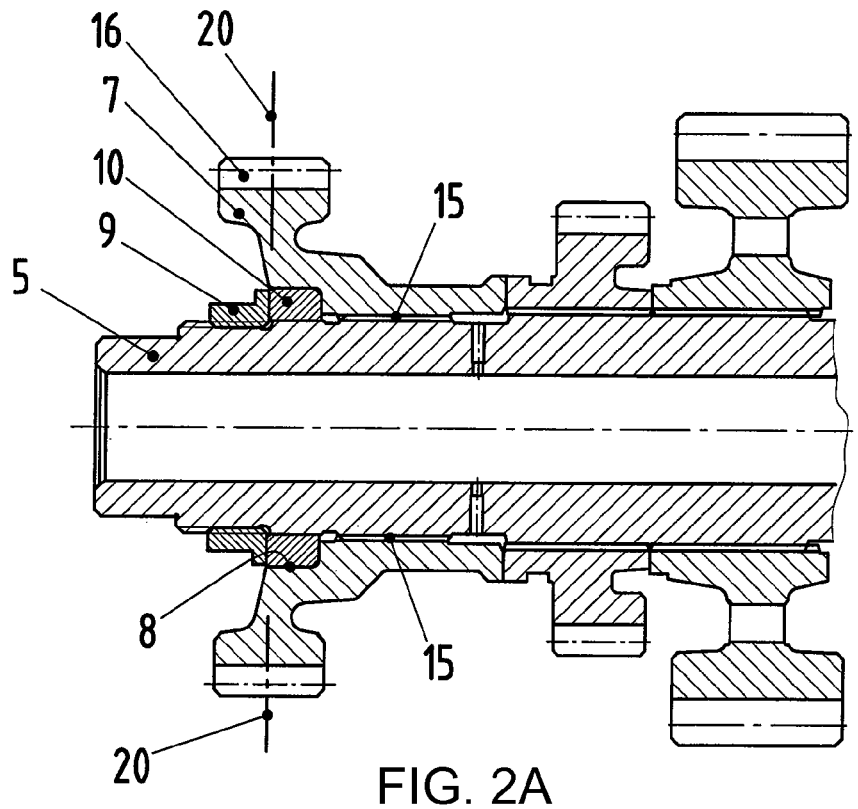
FIG. 2A is a diagrammatic illustration of a fastening apparatus according to a first exemplary embodiment.
Figure 2B:
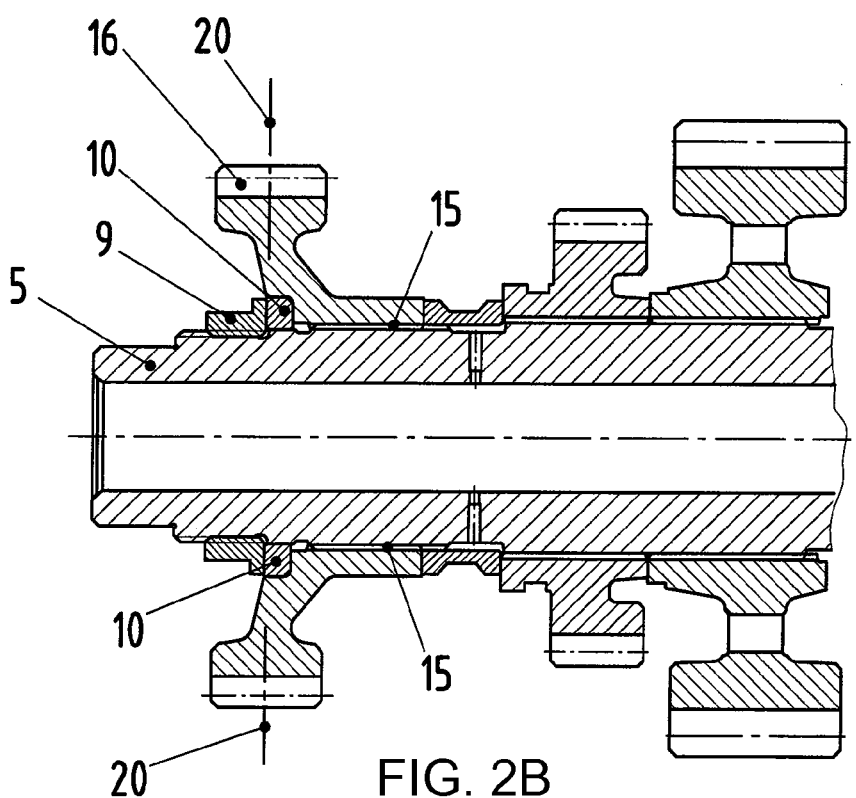
FIG. 2B is a diagrammatic illustration of the fastening apparatus according to the first exemplary embodiment.
Figure 4:
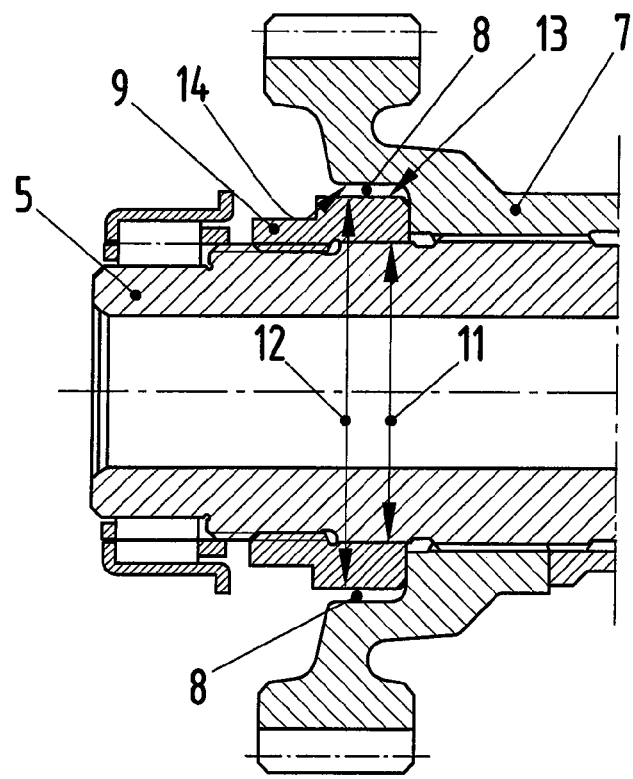
FIG. 4 is an enlarged view of the fastening apparatus according to the second exemplary embodiment.

FIG. 2B shows the fastening sleeve 10 with a narrow width which differs from that of FIG. 2A. The fastening sleeve extends at least as far as the center 20 of the gear toothing system 16. According to both arrangements from FIGS. 2A and 2B, the fastening sleeve represents a decoupling section between the fixed gear and the fastening nut with regard to vibrations or micromovements. The fastening sleeve 10 is preferably configured in such a way that, during the operation of the change speed transmission, an outer surface 13 of the fastening sleeve 10 remains spaced apart from an inner surface 14 of the fixed gear 7 according to FIG. 4. A spacing of this type can be between 0.01 mm and 0.06 mm, preferably approximately 0.05 mm. That is, an outer diameter 12 of the sleeve 10 is slightly smaller than an inner diameter of the annular recess 8 formed in the fixed gear 7.

Further, the locating fit or the seat at an inner diameter 11 of the fastening sleeve 10 is smaller, or narrower, than the locating fit at the outer diameter 12 of the fastening sleeve (10).

Figure 3:
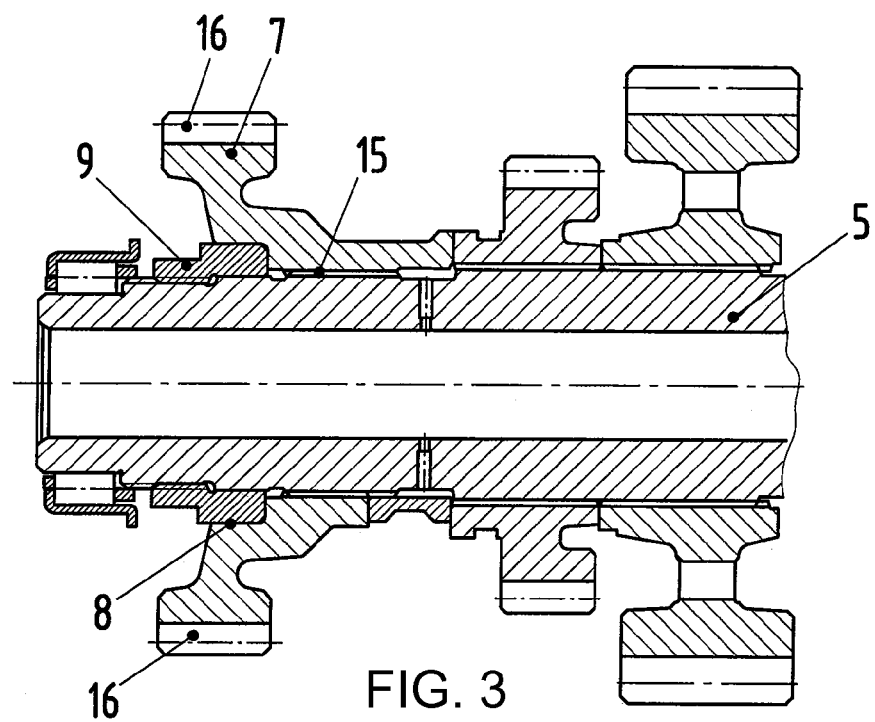
FIG. 3 is a diagrammatic illustration of the fastening apparatus according to a second exemplary embodiment.

According to a second exemplary embodiment of the invention, the fastening nut 9 and the fastening sleeve 10 according to FIG. 3 are of single piece configuration. Here, as in the first embodiment, the fastening sleeve 10 is also configured in such a way that, during operation of the change speed transmission, an outer surface 13 of the fastening sleeve 10 remains spaced apart from an inner surface 14 of the fixed gear 7 according to FIG. 4. As a result of this refinement, micromovements of the fixed gear 7 are not transmitted to the fastening sleeve, so that loosening of the fastening nut 9 does not take place. As a result, necessary caulking of the fastening nut 9 becomes superfluous. Moreover, cost advantages are achieved and installation space is gained in the transmission 1 in the axial direction as a result of the omission of the caulking. The gear toothing system 16 is preferably configured as a helical toothing system, but the refinement according to the invention is also suitable for a spur toothing system.

According to the invention, the center 20 of the gear toothing system 16 of the fixed gear is offset or spaced apart from the intermeshing toothing system 15 in the axial direction, with the result that the torques are guided around the fastening sleeve 10 or are transmitted past the fastening sleeve.

The invention relates to a change speed transmission 1, in particular a dual clutch transmission, having a plurality of transmission shafts and a fastening apparatus for at least one fixed gear 7 on one of the transmission shafts, the fixed gear being held axially on the transmission shaft 5 by means of a fastening nut 9. Here, a gearwheel set is clamped axially on the transmission shaft 5 by the fastening nut 9. According to the present invention, the fixed gear 7 is configured in such a way that a recess 8 which is formed around the transmission shaft is provided in a region below the gear toothing system 16, a fastening sleeve 10 being positioned in the recess 8 between the fixed gear 7 and the transmission shaft 5 in a section which is adjacent to the fastening nut 9. During clamping of the fastening nut 9, the latter bears against the fastening sleeve 10. As a result, the transmission of micromovements to the fastening nut 9 is minimized or prevented, so that loosening of the fastening nut 9 does not take place during operation of the change speed transmission 1.

The exemplary embodiments and the arrangement of the fixed gear on the main shaft 5 are not to be understood as a restriction of the invention. Although the exemplary embodiments relate to a dual clutch transmission, the fastening apparatus which is described here can be used for any design of transmissions within the scope of the present invention. Moreover, the fastening apparatus can be used for every transmission gearwheel which is configured as a fixed gear. Here, the fixed gear can be arranged on the first input shaft, on the second input shaft or on the output shaft. Moreover, the present invention can be used in conjunction with automatic transmissions and with other embodiments of change speed transmissions and dual clutch transmissions.

The invention claimed is:

1. A transmission, comprising:
a plurality of transmission shafts;
a transmission gearwheel fastened to one of said transmission shafts, said transmission gearwheel being configured as a fixed gear having an inner surface;
a fastening nut holding said fixed gear axially on said transmission shaft;
said fixed gear having a recess formed around said transmission shaft in a section adjoining said fastening nut; and
a fastening sleeve disposed in said recess, between said fixed gear and said transmission shaft, said fastening sleeve and said fastening nut being integrally formed in a single piece, said fastening sleeve having an outer surface that remains spaced apart from said inner surface of said fixed gear.

2. The transmission according to claim 1, wherein said fastening sleeve extends in an axial direction at least as far as a center of a gear toothing of said fixed gear.

3. The transmission according to claim 1, wherein said fixed gear is formed with a helical gear toothing system.

4. The transmission according to claim 1, wherein said fixed gear is formed with a spur toothing system.

5. The transmission according to claim 1, configured as a dual clutch transmission.

6. The transmission according to claim 1, wherein said plurality of transmission shafts includes an idler shaft and said fixed gear is mounted on said idler shaft.

7. The transmission according to claim 1, wherein a locating fit of an inner diameter of said fastening sleeve is smaller than a locating fit of an outer diameter of said fastening sleeve.

8. The transmission according to claim 7, wherein said outer diameter is dimensioned such that, during an operation of the transmission, said outer surface of said fastening sleeve remains spaced apart from said inner surface of said fixed gear.

9. The transmission according to claim 1, which comprises an intermeshing toothing system connecting said fixed gear to said transmission shaft.

10. The transmission according to claim 9, wherein a center of a gear toothing system of said fixed gear is offset in an axial direction from said intermeshing toothing system.

11. The transmission according to claim 10, wherein said fastening sleeve extends in the axial direction at least as far as the center of the gear toothing system.

* * * * *